United States Patent [19]

Hsiao

[11] Patent Number: 5,764,976

[45] Date of Patent: Jun. 9, 1998

[54] METHOD AND SYSTEM OF DEADLOCK DETECTION IN A DATA PROCESSING SYSTEM HAVING TRANSACTIONS WITH MULTIPLE PROCESSES CAPABLE OF RESOURCE LOCKING

[75] Inventor: Hui-I Hsiao, Yorktown Heights, N.Y.

[73] Assignee: International Business Machines Corporation, Armond, N.Y.

[21] Appl. No.: 384,069

[22] Filed: Feb. 6, 1995

[51] Int. Cl.$^6$ ........................................... G06F 17/30
[52] U.S. Cl. ........................ 395/608; 395/616; 395/674; 395/726
[58] Field of Search .................... 395/600, 725, 395/650, 608, 616, 674, 726

[56] References Cited

U.S. PATENT DOCUMENTS

| | | | |
|---|---|---|---|
| 5,193,188 | 3/1993 | Franaszek et al. | 395/600 |
| 5,251,318 | 10/1993 | Nitta et al. | 395/725 |
| 5,263,155 | 11/1993 | Wang | 395/600 |
| 5,440,743 | 8/1995 | Yokota et al. | 395/650 |
| 5,452,445 | 9/1995 | Hallmark et al. | 395/600 |

*Primary Examiner*—Thomas G. Black
*Assistant Examiner*—Cheryl Lewis
*Attorney, Agent, or Firm*—Jenkens & Gilchrist, PC; Michael J. Balconi-Lamica, Esq.; Richard M. Ludwin, Esq.

[57] ABSTRACT

A deadlock detection system and method that checks the state of a lock owning process and the duration of the lock before adding an edge to the wait-for graph. If the lock owning process is not in the wait state and the lock is of medium duration, no edge is added to the wait-for graph.

14 Claims, 3 Drawing Sheets

METHOD AND SYSTEM OF DEADLOCK DETECTION IN A DATA PROCESSING SYSTEM HAVING TRANSACTIONS WITH MULTIPLE PROCESSES CAPABLE OF RESOURCE LOCKING

TECHNICAL FIELD OF THE INVENTION

This invention pertains in general to data processing systems and in particular to parallel database systems and more particularly to deadlock detection in systems having transactions with multiple processes capable of locking resources.

BACKGROUND OF THE INVENTION

In parallel databases and other systems that require frequent resources sharing, system elements can lock a specific resource. A locked resource can be read or modified by the system element holding the lock. The element may release the lock at any time.

The system element that requests a lock and processes the locked resource is called a "transaction." Transactions are comprised of one or more processes. Each process, in turn, can request a lock. Thus, a single transaction may have multiple locks on different, or the same, resources. When a transaction is finished with a resource, it can either commit or roll back the resource. Committing the resource means making any changes permanent while rolling back means to restore the resource to its original state.

It is possible for a data processing system having multiple transactions to become deadlocked. Deadlock occurs when multiple transactions are waiting for the availability of multiple resources that will not become available because they are being held by other transactions in a similar wait state. Deadlock can bring a data processing system to a halt.

To break deadlock, data processing systems employ deadlock detection systems. These deadlock detection systems work by building a wait-for graph for all transactions in the wait state. Next, a cycle detection algorithm is run to find any cycles in the graph. If a cycle exists, there is a deadlock.

For example, FIG. 1 shows a wait-for graph built by a prior art deadlock detection system. The graph has two transactions, T1 and T2, and two resources, R1 and R2. The arcs from R1 to T1 and R2 to T2 indicate that R1 and R2 are locked by T1 and T2, respectively. The arcs from T1 to R2 and T2 to R1 indicate that T1 and T2 are waiting for R2 and R1, respectively. The clockwise cycle in FIG. 1 indicates that there is a deadlock.

Prior art deadlock detection systems, however, report phantom deadlocks in systems where one transaction has multiple processes. For example, FIG. 2 shows a wait-for graph built in a system having two resources, R1, R2, two transactions, T1, T2, and two processes per transaction, A,B and C,D, respectively. R1 is locked by B and R2 is locked by C. In addition, D is waiting for R1 and A is waiting for R2. A prior art deadlock detection system would report that the system is deadlocked because T1 and T2 are each waiting for resources held by the other. However, the above deadlock report is premature because it is possible for B to release its lock on R1 before T1 commits, thus breaking the lock cycle.

SUMMARY OF THE INVENTION

Therefore, it is an object of the present invention to provide a method and system of deadlock detection that does not report such phantom deadlocks.

It is a further object of the present invention to provide a method and system of deadlock detection that correctly reports deadlocks in systems in which transactions have multiple processes.

The above and other objects are achieved by a deadlock detection system and method that checks the state of a lock owning process and the duration of the lock before adding an edge to the wait-for graph. If the lock owning process is not in the wait state and the lock is of medium duration, no edge is added to the wait-for graph.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
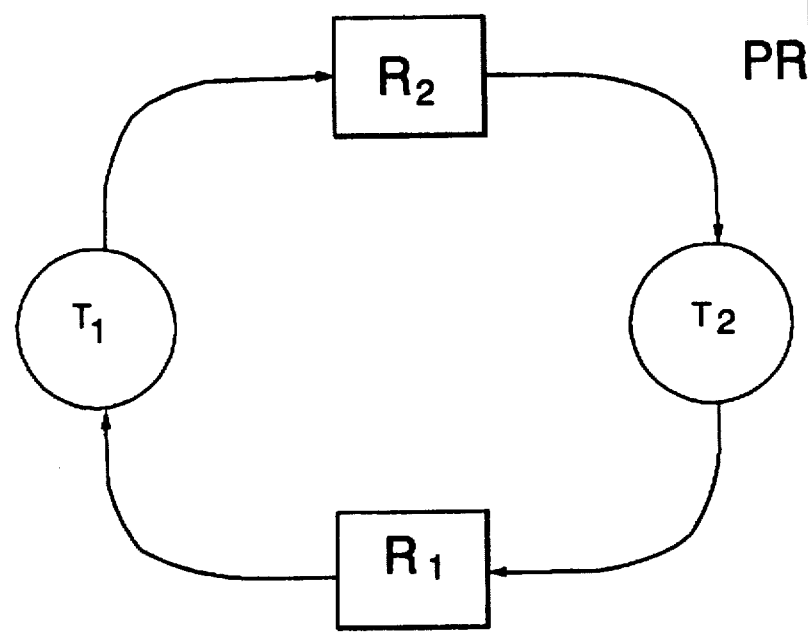
FIG. 1 shows a wait-for graph generated by a prior art deadlock detection system.
Figure 2:
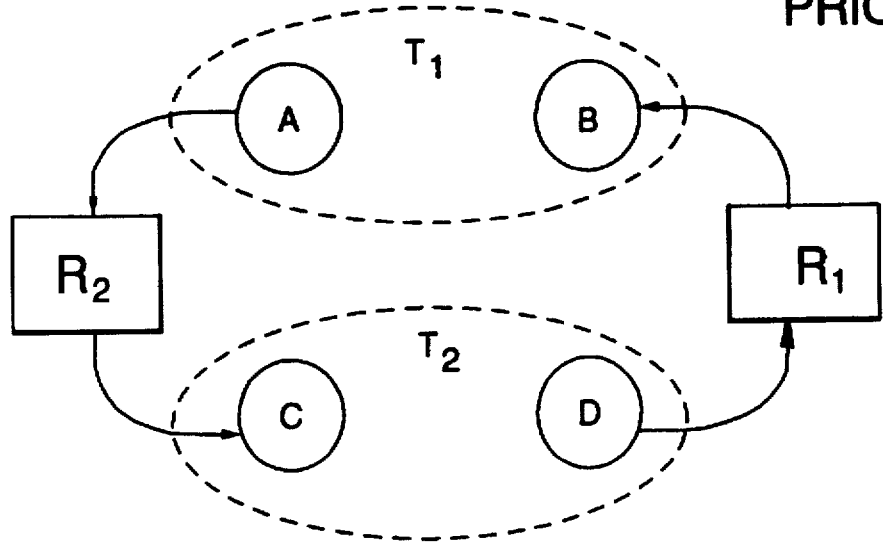
FIG. 2 shows a wait-for graph generated by a prior art deadlock detection system.
Figure 3:
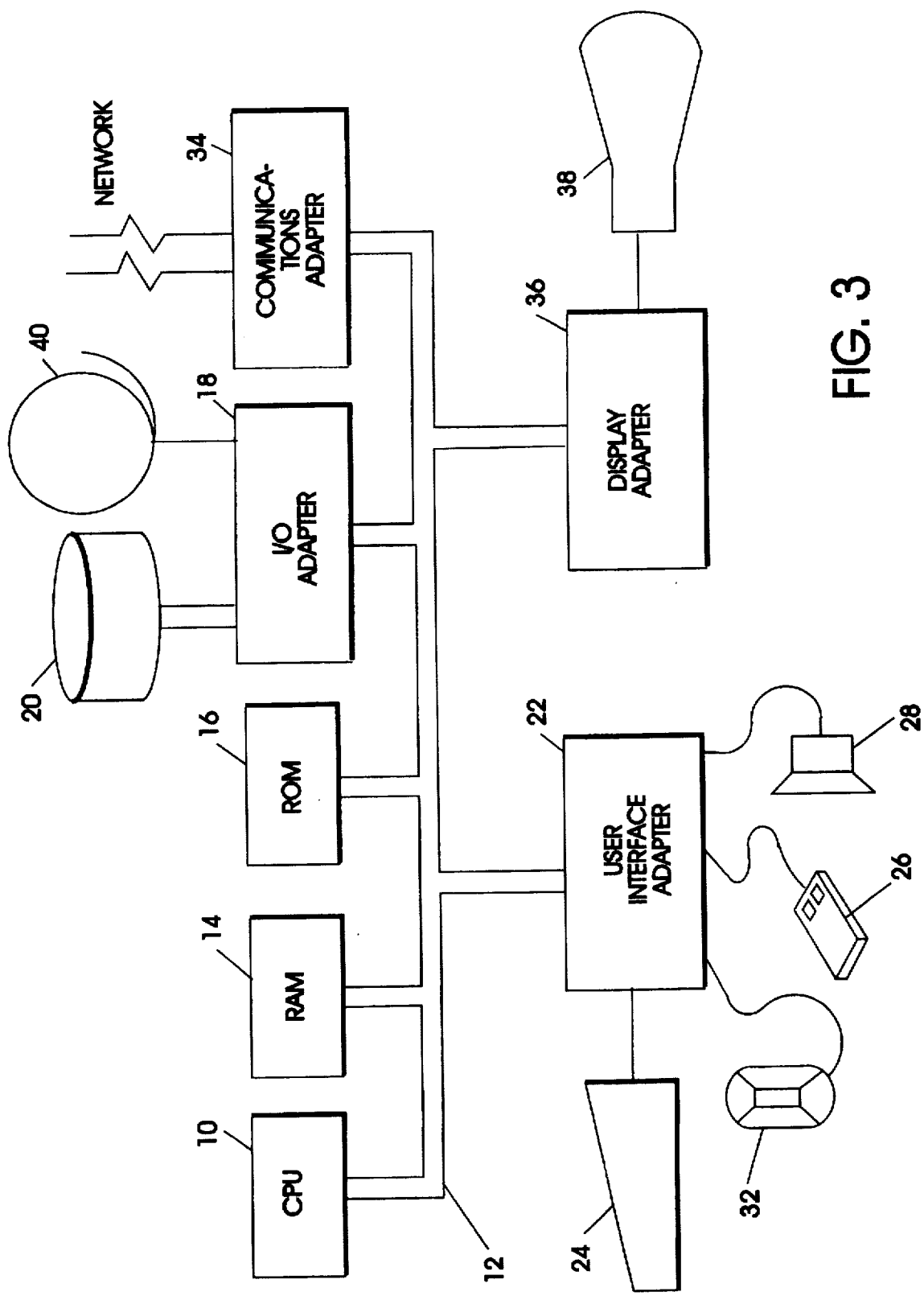
FIG. 3 shows a data processing system adapted for execution of a preferred embodiment of the present invention.

A hardware system for practicing the present invention is depicted in FIG. 3, which illustrates a typical hardware configuration of a workstation in accordance with the subject invention having at least one processing unit 10, such as a conventional microprocessor, and a number of other units interconnected via system bus 12. The workstation shown in FIG. 3 includes random access memory (RAM) 14, read only memory (ROM) 16, and input/output (I/O) adapter 18 for connecting peripheral devices such as disk units 20 and tape drives 40 to bus 12, user interface adapter 22 for connecting keyboard 24, mouse 26, speaker 28, microphone 32, and/or other user interface devices such as a touch screen device (not shown) to bus 12, communication adapter 34 for connecting the workstation to a data processing network, and display adapter 36 for connecting bus 12 to display device 38.

Processor 10 executes a database management system (DBMS) that supports transactions having multiple processes and resource locking, such as the IBM DB2/6000 Parallel Edition. The DBMS manages a database of information. A user can access the database by running programs on the DBMS. The DBMS and other programs are stored in RAM 14 and can also be stored on disk units 20 and tape drives 40. For a general understanding of databases and DBMSs, the reader is advised to consult Jim Gray & Andreas Reuter, *Transaction Processing: Concepts and Techniques*, Morgan-Kaufmann, 1993, which is hereby incorporated by reference.

The DBMS maintains a lock table with an entry for each locked resource. The lock table entry contains information associated with the lock, including the IDs of the processes and transactions that have a lock on the resource, the lock mode (exclusive or shared) and the duration of the lock (i.e., a requested duration associated the lock for a corresponding locked resource). The DBMS also maintains a separate wait-for table with an entry for each transaction having at least one process in a lock wait state. Each entry in the wait-for table has an associated linked list. Each element of the linked list identifies the waiting process and has a pointer to the resource for which it is waiting.

The DBMS periodically executes a deadlock detection program (DDP). The DDP scans the lock and wait-for tables and builds a wait-for graph using the steps detailed below. After the graph is built, the DDP checks it for cycles. If the graph contains a cycle, then deadlock exists. If deadlock exists, the DDP rolls back a transaction and, thereby, frees the resources and locks held by that transaction. This way, deadlock is broken.

Figure 4:
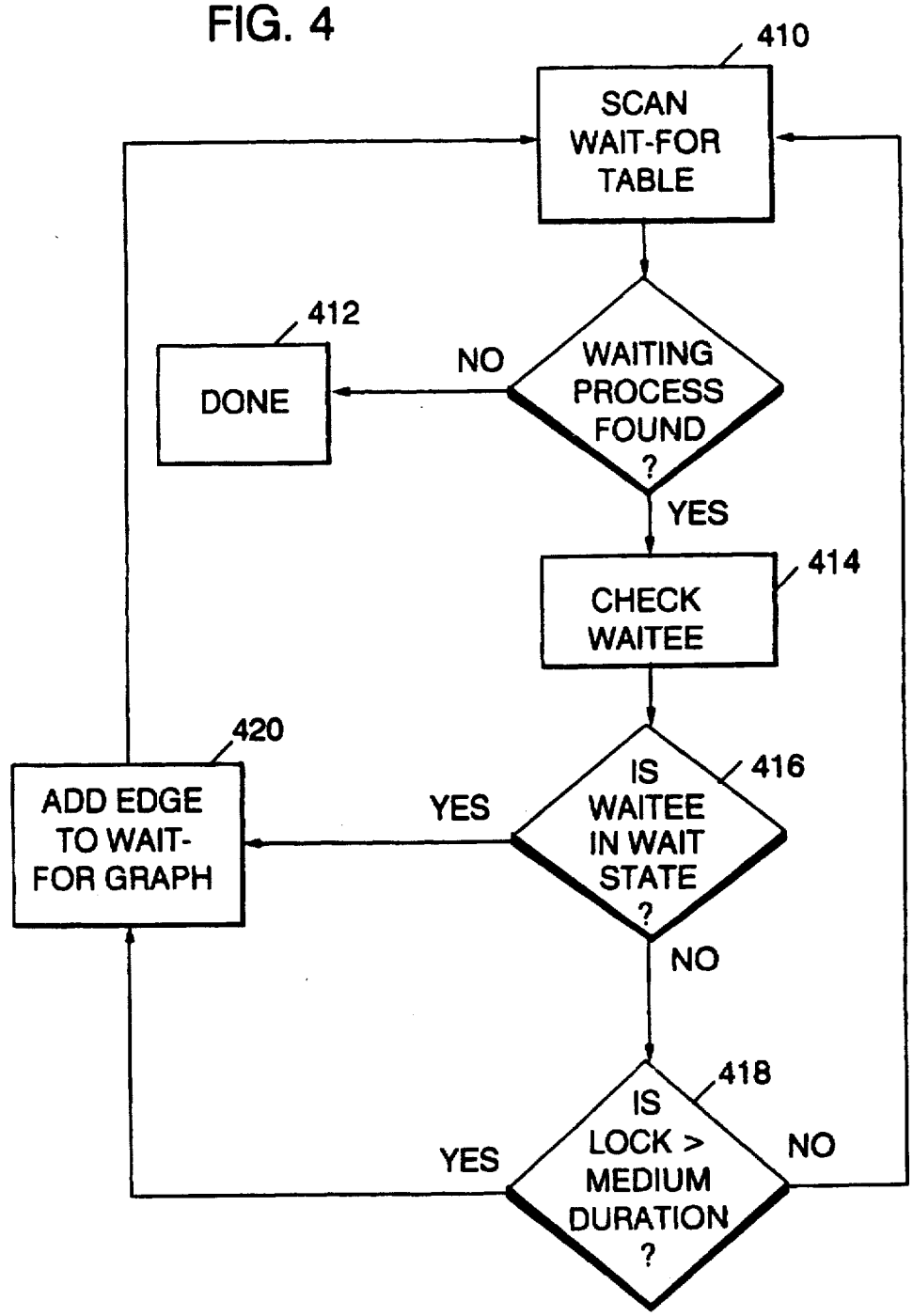
FIG. 4 shows a flow chart of the steps performed by a preferred embodiment of the present invention.

Referring now to FIG. 4, the steps followed by the DDP when building a wait-for graph in accordance with the present invention will be described. At step 410, the DDP scans the wait-for table. If no waiting processes are found, the DDP ends its execution (step 412). If the DDP finds a process waiting for a resource, it looks in the lock table to determine the process having the lock on that resource (the "waitee") (step 414). If the waitee is waiting for another resource (step 416) or the duration (i.e., requested duration) of the lock is longer than medium (step 418), the DDP adds an edge to the wait-for graph for this wait (step 420). The DDP performs these steps for each waiting process in the wait-for table.

The rationale for the operation of the DDP is that an active waitee will release a medium duration lock in the near future and should not be considered a member of a deadlocked group. The active waitee will probably release the lock before its transaction commits. Therefore, a true deadlock does not yet exist. Of course, if a true deadlock later occurs, it will be detected by the DDP and handled accordingly.

Although the present invention and its advantages have been described in detail, it should be understood that various changes, substitutions and alterations can be made herein without departing from the spirit and scope of the invention as defined by the appended claims.

What is claimed is:

1. A method of detecting deadlock in a data processing system comprising the steps of:

scanning a wait-for table for a process in a wait state, said process waiting for a resource and referred to as said waiting process;

checking a waitee corresponding to a second process having a lock on the resource being waited for by said waiting process to determine if said waitee is in a wait state waiting for another resource;

adding an edge to a wait-for graph if said waitee is in the wait state; and if said waitee is not in the wait state, checking a requested duration of the lock held by said waitee and adding an edge to said wait-for graph if the requested duration of the lock held by said waitee is greater than a predetermined limit, wherein a premature detection of a deadlock situation is avoided.

2. The method of claim 1, further comprising the step of checking said wait-for graph for cycles, wherein the presence of a cycle is indicative of a deadlock situation.

3. The method of claim 1, further comprising the step of rolling back either said waitee or said waiting process when said waitee or said waiting process is considered a member of a deadlocked group.

4. The method of claim 1, wherein said predetermined limit is a medium duration.

5. A data processing system for detecting deadlock, comprising:

a processing unit;

a database management system processed by said processing unit;

a first locked resource;

a second locked resource;

a table associated with said database management system, said table having first and second entries associated with said first and second locked resources, said first and second entries each having a waiting process and a waitee, wherein a respective waitee corresponds to a process having a lock on the resource being waited for by a respective waiting process;

a wait-for graph;

first edge building means for building an edge in said wait-for graph when said waitee of said first locked resource is said waiting process of said second locked resource; and second edge building means for building an edge in said wait-for graph when said waitee of said first locked resource is not said waiting process of said second locked resource and a requested lock duration of said first locked resource is greater than a predetermined limit, wherein a premature detection of a deadlock situation is avoided.

6. The data processing system of claim 5, further comprising cycle detection means for detecting a cycle in said wait-for graph, wherein the presence of a cycle is indicative of a deadlock situation.

7. The data processing system of claim 5, further comprising roll back means for rolling back said waitee of said first locked resource when said waitee is considered a member of a deadlocked group.

8. The data processing system of claim 5, wherein said predetermined limit is a medium duration.

9. The data processing system of claim 5, wherein said table further comprises:

a lock table having first and second entries associated with said first and second locked resources, respectively, said first entry having a first waitee and said second entry having a second waitee; and a wait-for table having first and second entries, said first entry having a first waiting process and said second entry having a second waiting process.

10. A data processing system for detecting deadlock comprising:

a processing unit;

a database management system processed by said processing unit;

a table associated with said database management system, said table including a wait-for table;

means for scanning the wait-for table for a waiting process corresponding to a process in a wait state waiting for a resource;

a wait-for graph;

first edge building means for checking a waitee corresponding to a second process having a lock on the resource being waited for by said waiting process to determine if said waitee is in a wait state waiting for another resource and adding an edge to the wait-for graph if said waitee is in the wait state; and second edge building means for checking a requested duration of the lock held by said waitee if said waitee is not in a wait state and adding an edge to said wait-for graph if the requested duration of the lock held by said waitee is greater than a predetermined limit, wherein a premature detection of a deadlock situation is avoided.

11. The system of claim 10, further comprising cycle detection means for detecting a cycle in said wait-for graph, wherein the presence of a cycle is indicative of a deadlock situation.

12. The system of claim 10, further comprising roll back means for rolling back either said waitee or said waiting process when said waitee or said waiting process is considered a member of a deadlocked group.

13. The system of claim 10, wherein said predetermined limit is a medium duration.

14. The data processing system of claim 10, wherein said table further comprises:

a wait-for table having entries corresponding to waiting processes; and a lock table having entries corresponding to waitees and locked resources, wherein each respective locked resource is associated with a respective waitee.

* * * * *